April 26, 1938. P. MANISCALCO 2,115,556
COMPRESSED AIR MOTOR
Filed Aug. 23, 1935 7 Sheets-Sheet 1
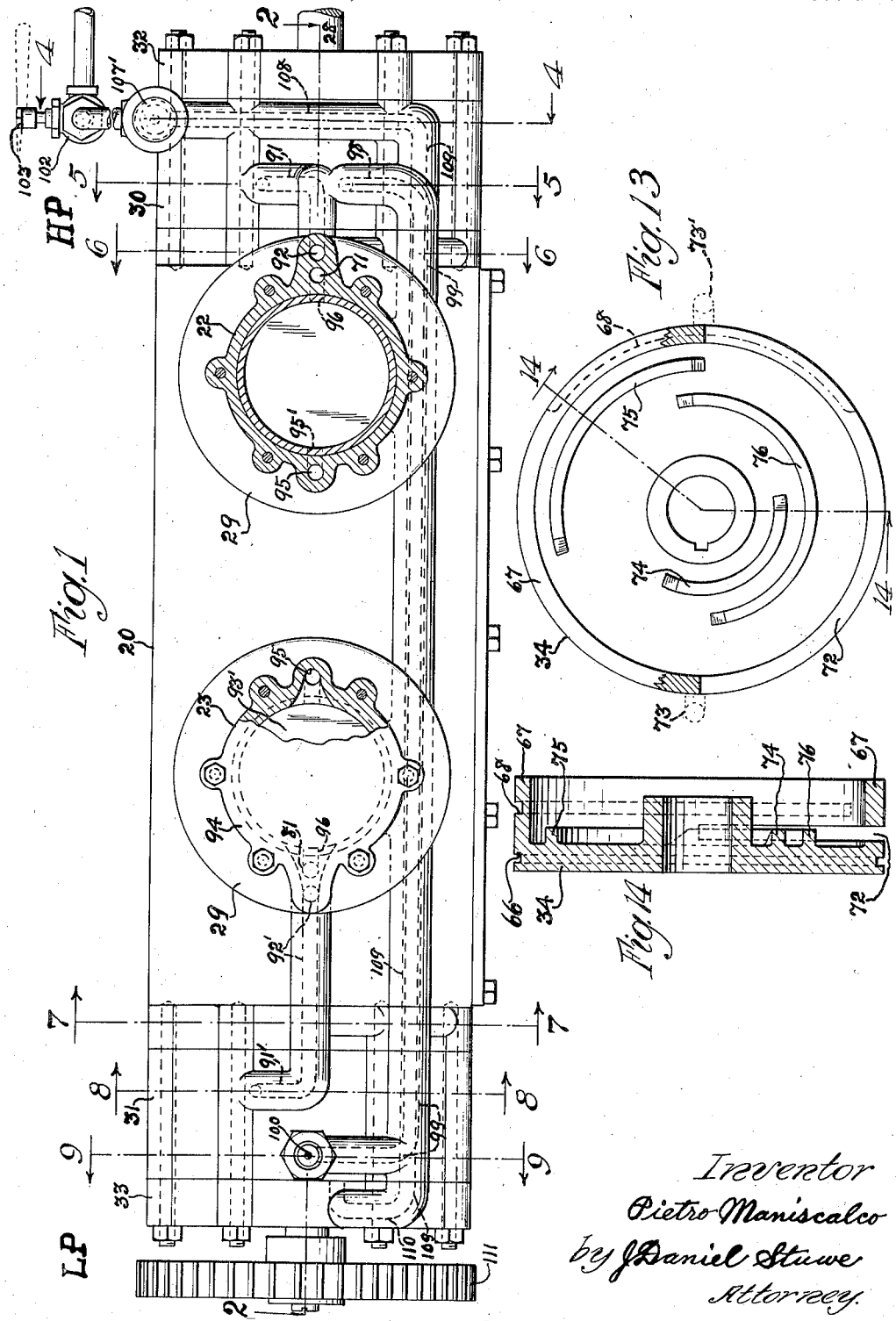
Inventor
Pietro Maniscalco
by J Daniel Stuwe
Attorney.

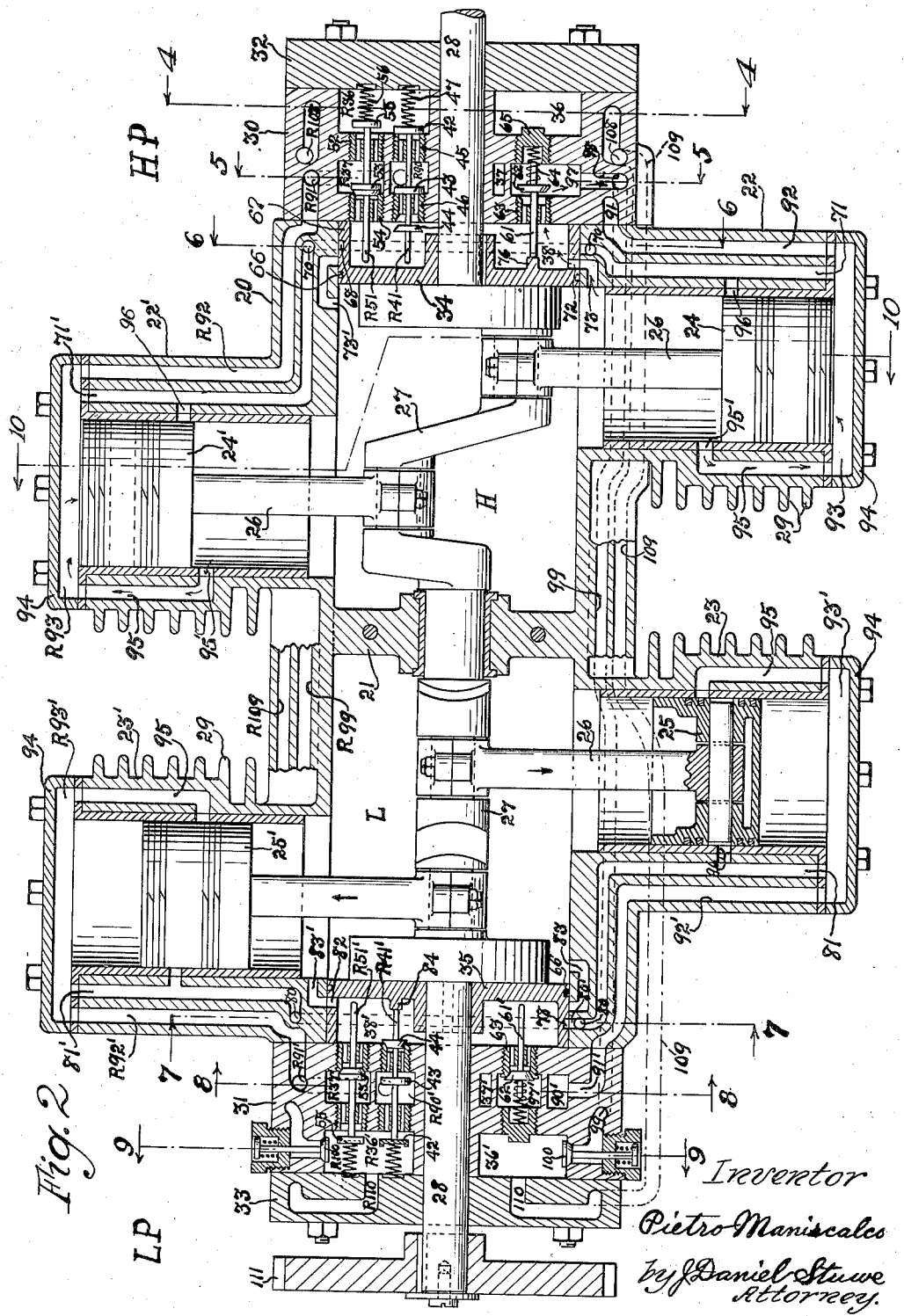

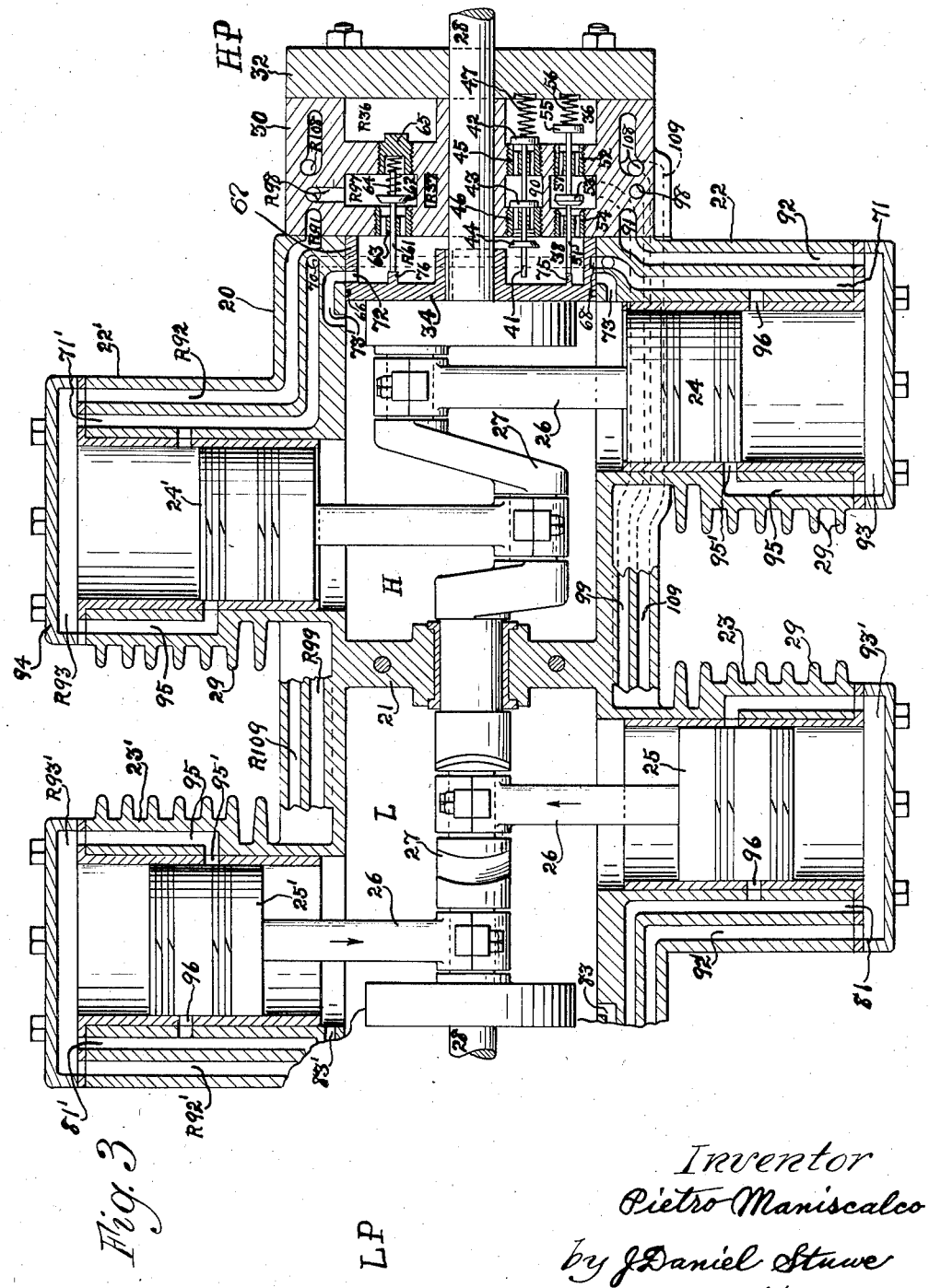

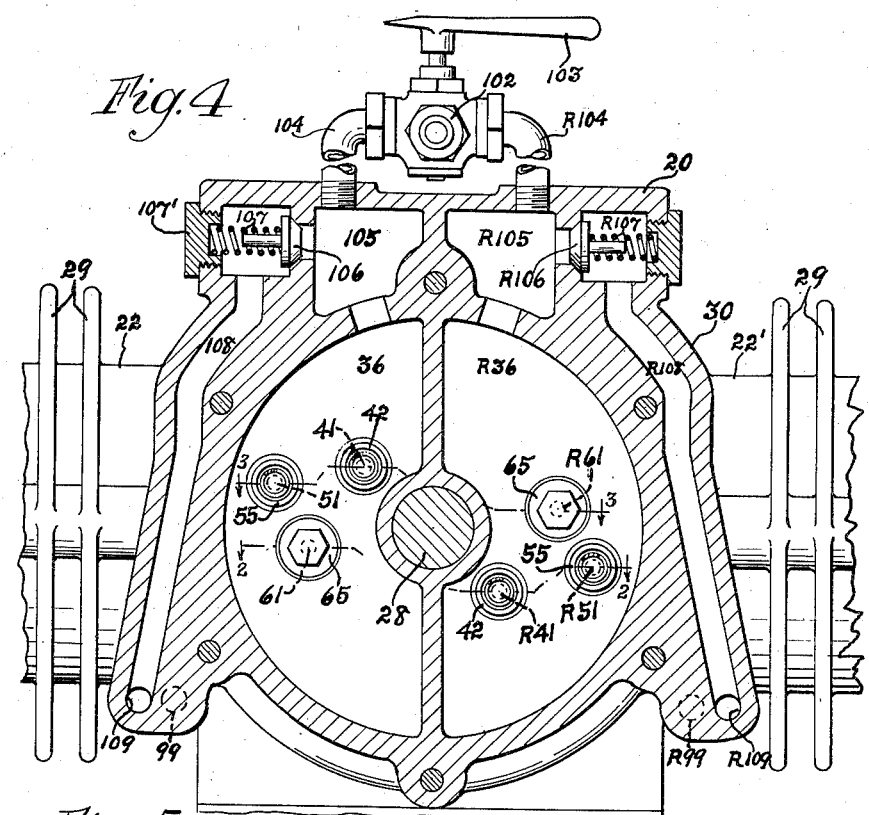
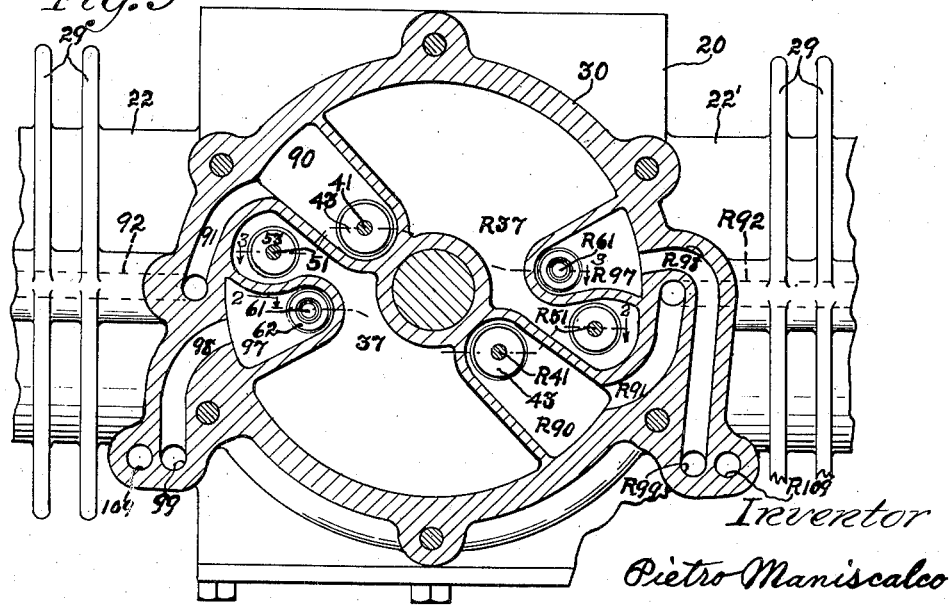

April 26, 1938.　　P. MANISCALCO　　2,115,556
COMPRESSED AIR MOTOR
Filed Aug. 23, 1935　　7 Sheets-Sheet 5

Inventor
Pietro Maniscalco
by J Daniel Stuwe
Attorney.

April 26, 1938. P. MANISCALCO 2,115,556
COMPRESSED AIR MOTOR
Filed Aug. 23, 1935 7 Sheets-Sheet 6

Inventor
Pietro Maniscalco
by J Daniel Stuwe
Attorney.

April 26, 1938.   P. MANISCALCO   2,115,556
COMPRESSED AIR MOTOR
Filed Aug. 23, 1935   7 Sheets-Sheet 7
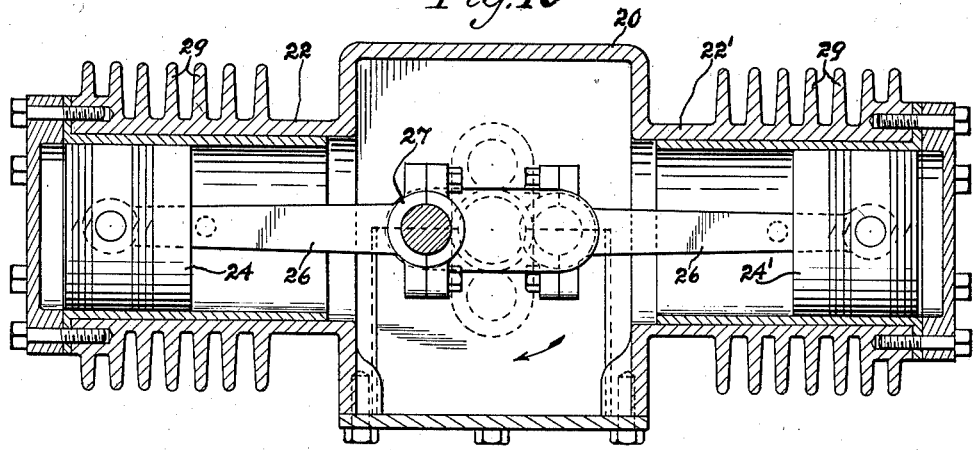
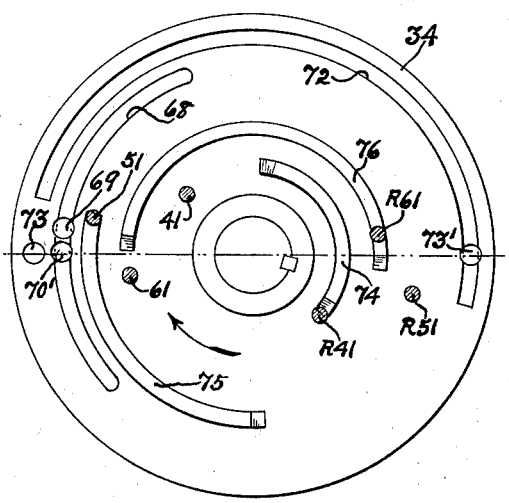
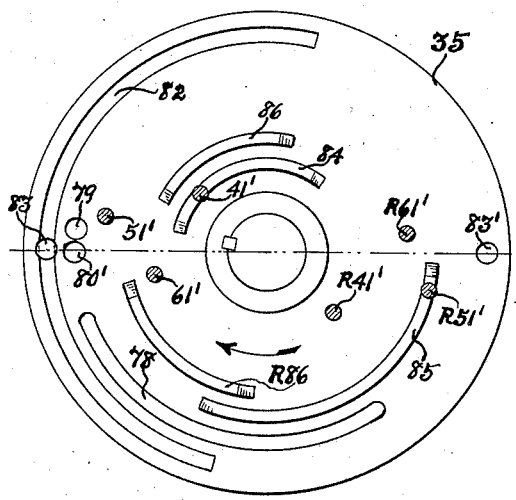
Inventor
Pietro Maniscalco
by J Daniel Stuwe
Attorney.

Patented Apr. 26, 1938

2,115,556

UNITED STATES PATENT OFFICE 2,115,556

COMPRESSED AIR MOTOR

Pietro Maniscalco, Toledo, Ohio

Application August 23, 1935, Serial No. 37,537

9 Claims. (Cl. 121—120)

This invention relates to improvements in compressed air motors.

One of the main objects of this invention is to provide a compressed air motor which will attain a high rate of efficiency and which will utilize to a maximum extent the energy obtainable from the compressed air to do work.

Another object is to provide such a motor whereby the efficient results are obtainable by first utilizing the highly compressed air for driving a set of high pressure pistons, and then additionally employing said compressed air to utilize the residue of the energy remaining therein, for driving a set of low pressure pistons.

A further object of this invention is to provide an efficient motor which is arranged and equipped with distinct sets of valves and mechanisms for operating the drive shaft and drive means in either the forward or the reverse direction.

These and various other objects and advantages will become apparent from the following description, taken in connection with the accompanying drawings, in which the invention is illustrated in its preferred form of construction, it being understood that various other arrangements and forms of construction may be resorted to for carrying out the objects and purposes of this invention.

In the drawings:

Fig. 1 is a side elevational view of my invention in its preferred form of construction, with parts broken away and parts shown in section.

Fig. 2 is a substantially horizontal sectional view of the invention, taken on line 2—2 of Fig. 1 looking in the direction of the arrows varying from said line 2—2 of Fig. 1 to show certain valves below the plane thereof as indicated by the partial section lines 2—2 in Figs. 4 and 5, some of the air-channels being shown diagrammatically.

Fig. 3 is a similar partial horizontal sectional view, showing the parts similar to Fig. 2, but showing valve members above the plane of line 2—2 of Fig. 1 as indicated by the partial section lines 2—2 in Figs. 4 and 5 and when the shaft has been rotated through 180°.

Figs. 4, 5, and 6 are enlarged vertical sectional views, taken respectively on lines 4—4, 5—5, and 6—6 of Figs. 1 and 2, at the high pressure or HP end of the motor, looking in the direction of the arrows.

Figs. 7, 8, and 9 are enlarged vertical sectional views, taken respectively on lines 7—7, 8—8, and 9—9, of Figs. 1 and 2, at the low pressure or LP end of the motor, looking in the particular directions of the connected arrows.

Fig. 10 is a vertical sectional view, taken along line 10—10 of Fig. 2.

Figs. 11 and 12 are views illustrating developments, into a plane of the rotary valve cams together with various ports, also shown in the plane, controlled by passageways through these cams respectively at the high pressure end and the low pressure end of the motor, but turned through approximately 190° from the positions shown in Figs. 6 and 7.

Fig. 13 is a face view of the valve cam at the HP end of the motor, placed substantially in the same position as in Fig. 6.

Fig. 14 is a sectional view, taken along line 14—14 of Fig. 13.

Figure 7:
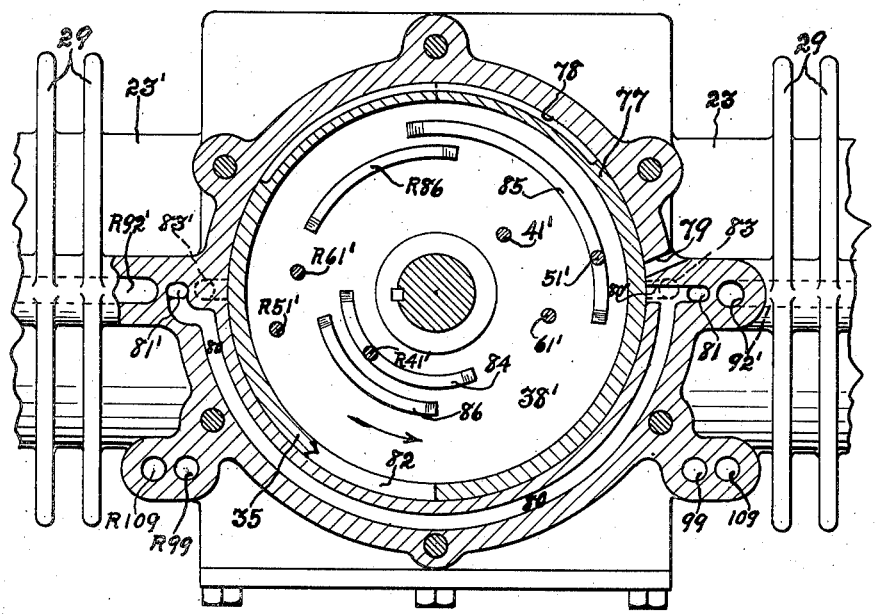

In carrying my invention into effect I have arranged the construction so that the compressed air is first admitted and is chiefly utilized at one end of the motor, which is herein termed the high pressure end or HP end, as indicated at the right hand end of Figs. 2 and 3. From this end the compressed air is transferred and admitted to the opposite end of the motor, which is herein termed the low pressure end or LP end, where the compressed air is then additionally employed to further utilize the remaining part or residue of its stored energy more completely for doing useful work.

In the drawings this invention is illustrated in its preferred form of construction, comprising a casing 20 which serves as a crank case and a main air case and is divided by a central wall 21 into the two chambers H and L, chamber H extending from said wall toward the HP end of the motor, and chamber L extending from said wall 21 toward the LP end. A pair of HP cylinders 22 and 22' extend in opposite directions from chamber H, and a similar pair of LP cylinders 23 and 23' extend in opposite directions from chamber L, said cylinders containing therein respectively the HP pistons 24, 24', and the LP pistons 25, and 25', which are pivotally connected by rods 26 with the wrist portions 27 of the crank shaft 28, as best shown in Figs. 2, 3, and 10. Cooling fins 29 are preferably also provided on the cylinders, which fins are not claimed to be new, per se, but are of a type similar to those variously used heretofore, as for example on the cylinders of air cooled internal combustion engines so that excessively hot air or gas charges may be employed and maintain the cylinders at sufficiently lower temperatures. These fins provide for the preferable operation of the air motor by highly heated gaseous fluids under pressure as desired.

Two similar sets of chambers and valve means are provided in each of the two ends of the motor, one set at each end being effective for driving the motor in a certain or forward direction, and the other set at each end for driving it in a reverse direction. These sets of chambers and means are preferably provided by the use of a pair of head members 30 and 31 and a pair of end plates 32 and 33 on the outer ends thereof, mounted respectively on the two ends HP and LP of the motor, as shown in Figs. 1 and 2, and a pair of cam members 34 and 35 are positioned respectively on the inward sides of the head members 30 and 31, being secured on shaft 28 to rotate therewith.

Figure 8:
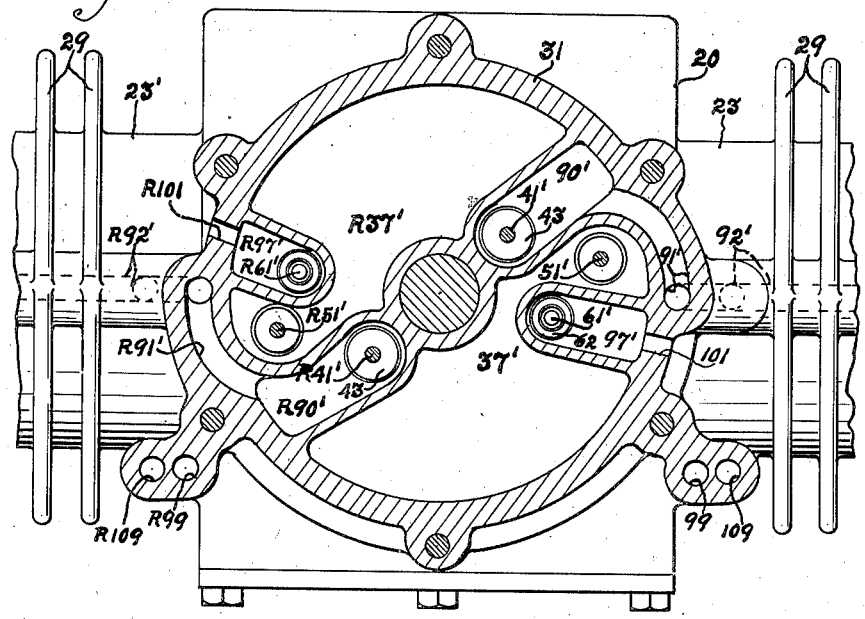
Figure 9:
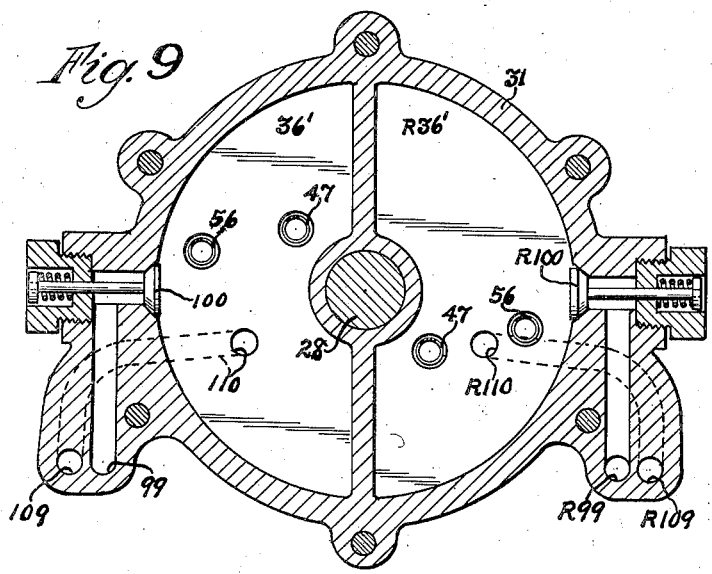

The chambers at each end of the motor include a pair of outer air receiving chambers; a group of intermediate valve chambers (see Figs. 2 and 4) and one inward air diversion chamber. At the HP end of the motor the receiving chambers include chamber 36 for forward, and R36 for reverse motion; while at the LP end (see Figs. 2 and 9) they include chambers 36' for forward, and R36' for reverse motion of the motor. These sets also include at the HP end (see Fig. 5) intake valve chamber 37 for forward, and R37 for reverse motion; and at the LP end (see Fig. 8) intake valve chamber 37' for forward, and R37' for reverse motion. The air diversion chambers include chamber 38 at the HP end (see Fig. 6), and chamber 38' at the LP end of the motor (see Fig. 7).

Four sets of valve devices are provided for the four sets of chambers, each set including three valves, a booster valve, an air intake valve and a transfer valve.

The four booster valves include valve 41 for forward, and R41 for reverse motion, at the HP end; and 41' for forward, and R41' for reverse motion, at the LP end of the motor. Each valve includes three valve elements or discs, 42, 43, and 44, adapted to engage the valve seats or sleeves 45 and 46, as illustrated, and being urged by a spring 47 to closed position. Element 44 closes sleeve 46 and prevents air flowing therethrough while elements 42 and 43 are open (see valve R41' in Fig. 2) and the high pressure air is flowing into the booster chamber of valve 41.

The four intake valves include valves 51 and R51 at the HP end, and 51' and R51' at the LP end of the motor; these valves being indicated in Figs. 11 and 12, valves R51 and R51' being shown in Fig. 2 and valve 51 being shown in Fig. 3. Each valve includes a guide member 52 and a valve element or disc 53 adapted to bear against a valve seat 54, and a spring head 55 on the outer end has a spring 56 bearing thereon for closing the valve.

The transfer valves include valves 61 and R61 at the HP end, and 61' and R61' at the LP end. Each valve includes a valve element or disc 62 adapted to close its valve seat 63, by the action of a spring 64 mounted in a cap 65 threaded in a head member (see Figs. 2 and 3).

Cam members 34 and 35 are provided respectively with lubricating grooves 66 and 66' in the periphery, the arrangement being shown best in Fig. 14.

The cam member 34 at the HP end of the motor, illustrated in Figs. 2, 3, 6, 13, and 14, and diagrammatically in Fig. 11, is secured on the crank shaft 28 to rotate therewith. It includes an outer cylindrical flange 67, best shown in Fig. 14, which extends toward and engages head member 30 and fits snugly within the cylindrical casing 20 as shown in Figs. 2 and 3. It has a cylinder release groove 68 extending part way around its periphery, adapted to connect an exhaust port 69 in the casing with a cylinder release opening 70' which leads from the inside of the casing to a cylinder release channel 70 extending semi-circularly of the casing wall and connecting two cylinder release ducts 71 and 71' which extend longitudinally of the cylinders 22 and 22'. A transfer slot 72 is provided substantially half way around the cam wall adapted to connect with two angular transfer ducts 73 and 73' provided in the casing wall, whereby to provide transfer of air between the inside of chamber H and the diversion chamber 38.

Figure 6:
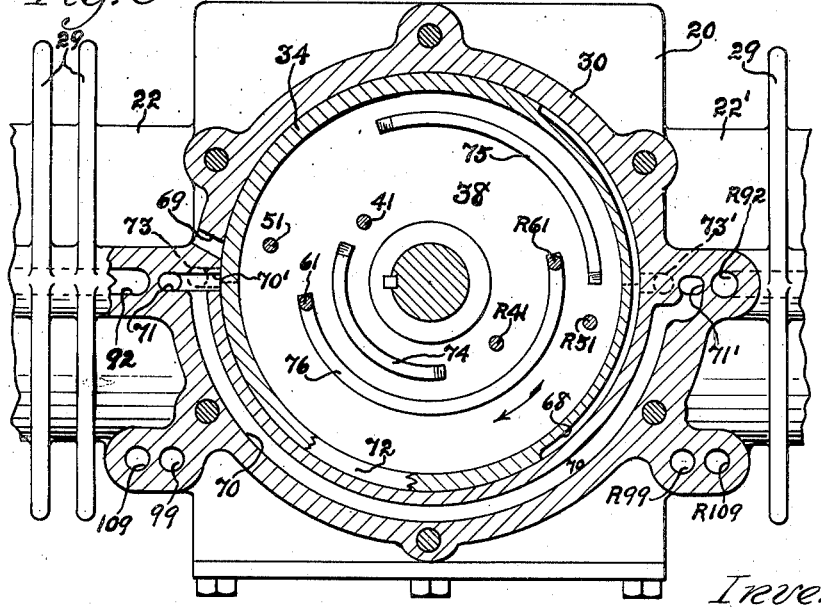

This cam member 34 has three curved elements or cams thereon, a booster cam 74 to actuate either one of the booster valves 41 and R41; an intake cam 75 to actuate either of the intake valves 51 and R51; and a transfer cam 76 which is of sufficient length to actuate both transfer valves 61 and R61 at the same time as shown in Fig. 6, as well as to actuate either one thereof.

The cam member 35 at the LP end of the motor (see Figs. 2, 7, and 12) is secured on the shaft 28 and has an outer flange 77 which extends toward the head member 31 and fits snugly in the casing, like cam 34. It has a cylinder release groove 78 extending partway around its exterior, adapted to connect an exhaust port 79 in the casing with a cylinder release opening 80' which leads from the inside of the casing to a cylinder release channel 80 extending semi-circularly of the casing wall and connecting two cylinder release ducts 81 and 81' which extend longitudinally of the cylinders 23 and 23' respectively. A transfer slot 82 is provided halfway around the cam wall adapted to connect with two angular transfer slots 83 and 83' provided in the casing wall, for effecting transfer of air between diversion chamber 38 and chamber L in the casing. This cam member 35 has four curved elements or cams thereon, instead of the three cams on member 34, including a booster cam 84 to actuate either one of the booster valves 41' and R41'; an intake cam 85 to actuate either of the intake valves 51' and R51'; a transfer cam 86 to actuate a transfer valve 61'; and a reverse cylinder release cam R86 to actuate the reverse cylinder release valve R61'. Valve R61' and its cam R86 are placed slightly farther outwards from the center of cam member 35 than are transfer valve 61' and its cam 86.

Referring to Figs. 2, 3, 5, and 8 observe that the booster valves 41 and R41 at the HP end of the motor operate in booster chamber 90 and R90 respectively, from which extend booster ducts 91 and R91 positioned in the wall of head member 30 and wherefrom continue booster ducts 92 and R92 extending longitudinally of the cylinders 22 and 22', to the head chambers 93 and R93 located in the caps 94 mounted on the outer ends of the cylinders. At the LP end of the motor the booster valves 41' and R41' operate in booster chambers 90' and R90' from which extend booster ducts 91' and R91' positioned in the wall of head member 31 and wherefrom continue booster ducts 92' and R92' longitudinally of the cylinders 23 and 23', to the head chambers 93' and R93' formed by the caps 94 at the outer ends of the cylinders. A channel 95 and an opening 95' in the wall of each cylinder provide a bypass permitting air to flow from below the piston to the head chamber when the piston is at the outer limit of its stroke, so as to provide air pressure on its outer end before its return stroke. A port 96 in the cylinder wall provides a short-cut enabling quick outflow of air ahead of the piston to duct 71.

At the HP end of the motor the transfer valves 61 and R61 operate in transfer chambers 97 and R97 (see Fig. 5), wherefrom extend transfer ducts 98 and R98 respectively in head member 30 and which continue as transfer channels 99 and R99 longitudinally of the casing wall into head member 31 at the LP end. There check valves 100 and R100 (see Fig. 9), admit the compressed air from said channels respectively into the receiving chambers 36' and R36', to pass through the valves and be further utilized. At the LP end the transfer valves 61' and R61' operate in chambers 97' and R97' (see Fig. 8), from which the air is exhausted through exhaust ports 101 and R101.

Referring to Figs. 2 and 4, observe that the control valve 102 is adapted to be actuated by handle 103 for admitting compressed air through either conduit 104 or R104 into either the forward chamber 105 or the reverse chamber R105 to pass therefrom respectively into either the receiving chamber 36 to effect a forward drive, or into the receiving chamber R36 to effect a reverse drive of the shaft 28.

Valves 106 and R106 which will be termed reducing valves and which open at certain times under air pressure are also provided on chambers 105 and R105 respectively, and are normally held closed by springs 107 seated in caps 107' threaded in the head member adapted to permit access to the valves and adjustment thereof. Said valves will open and permit the air, when it exceeds a certain pressure, to flow into relief ducts 108 and R108 in head member 30, and to pass therefrom through relief channels 109 and R109, which extend along the wall of the casing to end member 33, and thence flow through curved ducts 110 and R110, provided in the end member; and therefrom pass into the receiving chambers 36' and R36' respectively. It will be noted that during the operation of the motor with a normal supply pressure these valves remain closed but they can open under excess pressure. Their adjustment is such that they will open during the starting of the motor, noting that the pressure supplied to the "LP" receiving chambers will be atmospheric or if there is any residual pressure it will be negligible compared with the supply pressure, and thus either reducing valve 106 or R106 will open as will appear with respect to the operation of the motor in starting. During the operation of the motor where the receiving chambers at both the "HP" and "LP" ends are under operating pressures the pressure on the backs of these valves is such as to maintain them closed.

The driving power is transmitted from shaft 28 in any approved manner, as for example by a wheel 111 on the shaft, or the like.

Operation

It will be noted that by manipulating handle 103 the valve 102 may be opened to admit the air either to receiving chamber 36 for driving the mechanism in a forward direction, or to receiving chamber R36 for driving the mechanism in a reverse direction. Consider the operation of the motor to be in a forward direction and the members and parts at the HP end of the motor to be in the inner or retracted position at the beginning of the piston stroke, substantially as shown in Fig. 3; however, Fig. 3 shows the pistons and cams at the HP end a few degrees beyond the inner end or dead center and on the outward stroke. Referring to Figs. 2 and 6, it may be noted that the cams and mechanisms must be revolved 180° from the outer piston position shown therein to the inner one, so that the cams and elements are at the beginning of the expansion stroke. In this position the transfer slot 72 is in contact with transfer opening 73', shown at the right hand side of Figs. 3 and 11, and the intake cam 75 is coming in contact with the intake valve 51, to open this valve, being shown just opened in Fig. 3, and allow compressed air to flow through this valve 51 from the receiving chamber 36 through the valve chamber 37 into the diversion chamber 38 and from it through transfer slot 72 and transfer duct 73' into the high pressure chamber H of the casing, for driving the pistons on their outward stroke. This compressed air continues to enter the high pressure chamber H until cam 75 passes from valve 51 and the valve closes. The transfer slot 72 continues to remain open with the duct 73' during the balance of the outward piston broke, but for the latter part of the stroke or about 70° of rotation the air continues expanding. During this outward movement of these pistons the reverse transfer valves and booster valves are actuated but they do not effect the forward rotation because the reverse valves when thus actuated by their cams, only act on a dead side, since no air has been admitted thereto from the control valve or the receiving chamber R36 on the reverse side of the motor.

Now consider the valves and other members of the HP end of the motor standing in the position shown in Figs. 2 and 6, with pistons 24 and 24' at the outer end of the stroke, ready to start inwardly. The transfer of air from chamber H of the case to the head chambers 93 and R93 has been completed, by flowing through the channels or by-passes 95 and their openings 95' which are still uncovered; in this way a portion of the air in chamber H, which is still under considerable pressure is by-passed to the outer ends of the pistons, where the air had been exhausted to atmosphere, and thus equalizes the pressures on the two sides utilizing a small amount of the air from the chamber H. These pistons now start on the inward stroke, and the transfer slot 72 on cam 34 connects with the transfer duct 73 on the case (see the left side of Fig. 6 and the lower right of Fig. 2). Likewise, transfer cam 76 is opening transfer valve 61 into its chamber 97 (see Fig. 5), thereby permitting air to flow from casing chamber H through duct 73, slot 72, valve 61, chamber 97, and therefrom through duct 98 and transfer channel 99 to the LP end of the motor, there passing through check valve 100 into receiving chamber 36', wherefrom it is transmitted through the LP valves, as will be explained hereafter.

During this inward piston stroke on the HP end of the motor, after the pistons have closed the opening 95' with the by-pass 95, preventing further passage of air therethrough, the booster valve 41 is opened by its cam 74 (see Fig. 6), thereby admitting air from receiving chamber 36 into booster chamber 90 and therefrom through booster duct 91 and through duct 92 in the cylinder wall to the head chamber 93 at the outside of the piston. The booster valve is arranged so it will be actuated by its cam 74 (see Fig. 6) as to allow air under high pressure to enter booster chamber 90 and flow directly to ducts 91 and 92 and to chamber 93 at the cylinder head. This provides the air under high pressure to produce a boosting effect, that is increasing the pressure afforded by the air by-passed from chamber H to the full driving pressure, in driving the piston inwardly, and the booster valve is closed before the inward stroke is completed, so that the balance of the stroke is completed by the expansion of the compressed air.

During the outward stroke of the piston, from the position shown in Fig. 3, to the position shown in Fig. 2, the air ahead of or outward of the piston is exhausted by flowing through the release ducts 71 and 71', and at the beginning of the stroke air also passes for a short-cut through side ports 96. It then flows through cylinder release channel 70 and its release opening 70' into the cylinder release groove 68 which then connects said opening with exhaust port 69 (see Fig. 11), to exhaust the air from the piston heads directly to the atmosphere.

This completes a revolution of the mechanism at the HP end of the motor, and the operation continues, as set forth above.

Referring to Figs. 2, 7, and 11, consider the operation of the mechanism and course of the air after it has been transferred to the LP end as outlined above.

Observe from Fig. 2 that the air enters from transfer channel 99 through check valve 100 into receiving chamber 36' at said LP end. At this point the pistons 25 and 25' have been advanced from the inner limit half way or 90° on the outward stroke. Part of the transferred air flows directly into chamber L of the crank case (see Fig. 7), since the intake valve 51' is open and likewise the transfer slot 82 and duct 83' are open from diversion chamber 38' to the case (see upper left hand end of Fig. 2, also left side of Fig. 7). The balance of the air transferred to this end is held for the next outward stroke of these pistons 25 and 25'.

After the intake valve 51' closes, expansion of the air takes place and pistons 25 and 25' continue on their outward stroke to the outer position. At this point a transfer of air occurs from the cylinder through openings 95' and channels 95 to the heads of the pistons 25 and 25', like at the HP end. During this time the cam member 35 has been rotated 90° from the position shown in Fig. 7, in the forward direction indicated by the arrow, whilst said pistons reach the outer position. In this position the forward end of the transfer slot 82 on the cam (see bottom of Fig. 7) has just come in contact with the transfer duct 83 on the case (see right-hand side of Fig. 7 and lower left of Fig. 2); thereby allowing the air to flow out from case chamber L, away from the inner sides of pistons 25 and 25', through ducts 83 and slot 82 into diversion chamber 38'. At the same time transfer cam 86 (turned 90° forward on Fig. 7) has reached transfer valve 61' and opens it, to transfer the air from diversion chamber 38' to transfer chamber 97' (see Fig. 8) and therefrom exhaust it through exhaust port 101 to the atmosphere. This is a direct exhaust, and therefore cam 86 is shorter than cam 76 at the HP end whereby the air is transferred to the LP end.

On the following inward stroke of these pistons 25 and 25' at the LP end of the motor with the cam turned 90° from the position shown in Fig. 7, booster cam 84 opens booster valve 41', thereby admitting the air, previously used at the HP end, from the receiving chamber 36' into booster chamber 90' (see Fig. 8) and therefrom through booster duct 91' and 92' to the head chamber 93', against the outer side of the piston to drive it inward under the incoming air for the first part of the stroke and under the expansion of the air for the rest of the stroke, like at the HP end described above. On the outward stroke of these pistons, with parts in position at 90° backward from that shown in Fig. 7, and about 90° forward from that shown in Fig. 12, the air outward of these two pistons is exhausted by flowing from the cylinder heads through cylinder release ducts 81 and 81', and at first taking the short-cut through side ports 96, then flowing through cylinder release channel 80 and its release opening 80' into the cylinder release groove 78 which is then connected to exhaust port 79 to exhaust directly to the atmosphere.

At this LP end, as at the HP end described above, during the forward movement of the mechanism as set forth, the reverse side of the motor is a dead side or non-operating. If any air pressure is present on this reverse side during the forward rotation, then it is released by the intake cam 85 when it opens the reverse intake valve R51' while the transfer valve 61' and connected slots are exhausting air from the case. This prevents any chance of pressure building-up on the reverse side or idle side of the motor while the parts are operating in a forward direction.

The cams, valves and slots provided for accomplishing the reverse motion of the motor are substantially the same as those provided for accomplishing the forward motion, as fully set forth above, and are designated by the same reference numerals, plus the prefix R attached thereto; and the reversing rotation is also accomplished in a like manner as the forward rotation. The control valve 102 is turned to admit the compressed air to reverse inlet chamber R105 (see Fig. 4), wherefrom it flows into reverse receiving chamber R36, from which it passes at the appropriate times through the booster valves R41, the intake valve R51, and the transfer valve R61, and from them through the associated reversing elements at the HP end of the motor, in the same manner as explained for the forward rotation.

In case the motor has stopped with the pistons 24 and 24' at the HP end at the extreme outer position, as indicated in Figs. 2, 6 and 7, the intake valve 51 is free from its cam 75 and is closed; likewise the booster valve 41 is free from its cam 74 and is closed; thus no air can enter the crank case chamber H, or reach these pistons. However, no excessive air pressure will be allowed to build-up in the receiving chamber 36 and its inlet chamber 105, as the reducing valve 106 is adjusted to open at the proper time enabling the compressed air to flow into relief duct 108 and through relief channel 109 to the LP end, through duct 110 into the receiving chamber 36'. There, as shown by Fig. 7, the intake cam 85 holds the intake valve 51' open admitting said air from chamber 36' to valve chamber 37' (see Fig. 8) and therefrom to diversion chamber 38', through open transfer slots 82 and 83' (see Fig. 2), into the casing chamber L, to drive the pistons 25 and 25' outwards and start the motor in the forward direction.

In order to start the motor in the reverse direction, while the pistons 24 and 24' are at the outer limit of the stroke, as indicated in Figs. 2, 6 and 7, the air will be transferred from the HP end to the LP end and there admitted to the heads of pistons 25 and 25', to start the motor in its reverse rotation; in the following manner.

The air is admitted from control valve 102 into the reversing chambers R105 and R36, but as the reverse booster valve R41 and the reverse intake valve R51 are closed, the air pressure builds-up in chamber R36 to open the reducing valve R106 (see Fig. 4), whereby to transfer the air through relief duct R108 and channel R109 to the LP end of the motor, there entering through curved duct R110 into receiving chamber R36'. At said LP end the intake valve R51' is closed, but the booster valve R41' is held open by its cam 84 (see Figs 2, 7, and 8), and air passes therethrough from chamber R36' to booster chamber R90', to ducts R91' and R92' to chamber R93' against the head or outer side of piston 25', to drive it inwardly and start rotating the mechanism in the reverse direction. Under these conditions this provides the necessary starting motion to the mechanism up to where the cams and valves at the HP end become effective for further operating the motor.

This conducting of high pressure air to the LP end of the motor, either into chamber 36' or R36', is only necessary when the pistons 24 and 24' are either at the extreme outer end of their stroke, as shown in Fig. 2; or at the inner end or beginning of the expansion stroke, a bit inward from that indicated in Fig. 3, where these pistons are shown advanced 10° from the innermost point. Only in these two cases is the motor started from the LP end; otherwise the HP end is effective for starting it, either in the forward or in the reverse motion.

From the foregoing disclosure it will be apparent that with this arrangement and construction I have provided a compressed air motor comprising a primary and a secondary, or a high pressure and a low pressure, set of cylinders, wherein the primary set are placed at 90° advance of the secondary set, providing a lead-off and a follower impulse; arranged so as to utilize the energy of the compressed air largely in the primary or HP set, and then further utilize the balance of the energy remaining in said air for driving the secondary or LP set, thereby providing an improved performance.

It may also be observed that the cylinders and pistons of each set are built on the double opposed principle, admitting air in equal volume and force to each piston of the set, whereby to produce a balanced impulse to the crank shaft for smooth driving.

Note also that with this special valve arrangement and the associated ducts and channels the cylinders and pistons in each set become double acting, whereby the compressed air is admitted first to a certain side of the pistons to drive them in a certain direction, and is then admitted to the opposite side, to drive them in the reverse direction or on the return stroke, thereby providing increased efficiency over the usual type of motor.

It is furthermore apparent that with this disclosed provision of the duplex set of valves one can readily control and vary the direction of rotation of the drive shaft, so as to run the motor either forward or backward at will, and to reverse it readily from one direction of rotation to the other, by a slight turn of the control valve; thus avoiding any need of or any shifting of gears and the like for reversing the direction of motion of the machine driven by this motor.

I claim:

1. A compressed air motor comprising a crank case including an air chamber having a pair of oppositely directed cylinders thereon containing pistons movable in balanced relation therein, a crank shaft connected with said pistons and having cam means thereon, means including valve means actuated by said cam means to admit compressed air into the chamber against the inner sides of the pistons to drive them outwardly with equal force, by-pass means to transmit compressed air from the chamber around the pistons to their outer faces at the end of their outward stroke, valve means to admit compressed air to the outer face of a piston during part of the inward stroke after closing said by-pass means.

2. A compressed air motor comprising a crank case having a primary air chamber and a secondary air chamber, a set of oppositely directed cylinders on each chamber provided with pistons mounted in balanced relation therein, a crank shaft in said chambers actuated by said pistons, channel means provided with valve means actuated by said shaft to admit compressed air into the primary chamber to act with equal force against the inner sides of its pistons, channel means provided with valve means to transfer the air from the primary chamber toward the secondary chamber, valve means to admit compressed air to the outer sides of the primary pistons to drive them inwardly, valve means for discharging the air from the outer sides of the primary pistons to the atmosphere, valve means to admit said transferred air to the secondary chamber to press with equal force against the inner sides of its pistons, valve means for admitting transferred air to the outer sides of the secondary pistons to drive them inwardly, and valve means for discharging the air from the secondary chamber and the outer sides of the pistons thereof.

3. A compressed air motor comprising a crank case including a crank shaft therein having a cam member thereon, a pair of oppositely directed cylinders on said case and having pistons therein connected with said shaft, valve means actuated by said cam member to admit compressed air into said case to drive the pistons outwardly, valve means to admit air to the outer faces of said pistons to drive them inwardly, said valve means being arranged in two sets providing a set which is actuated by said cam member for driving the shaft in one direction, and another set of valve means actuated by said cam member for driving the shaft in the reverse direction, and control valve means for admitting the air to either set.

4. A compressed air motor comprising a crank case having a primary air chamber and a secondary air chamber, each chamber containing a plurality of cylinders thereon with pistons, the cylinders on the primary chamber comprising a pair which extend in opposite directions therefrom and which contain a pair of pistons operating in balanced relation therein, a crank shaft connected with all of said pistons, a forward set and a reverse set of valve means provided for said primary chamber, each set including intake valve means actuated by said shaft to admit compressed air to the primary chamber to drive its pair of pistons outwardly with equal force, valve means to admit the compressed air to the outer side of one of said pair of pistons to drive it inwardly, also transfer valve means whereby to transfer the utilized air from the primary chamber toward the secondary chamber, control means to admit the air to either the forward set or the reverse set of valve means, and valve means for admitting the transferred air to the secondary chamber to be further utilized in driving the motor.

5. A compressed air motor comprising a crank case containing a primary air chamber and a secondary air chamber and a crank shaft therein, a plurality of cylinders on each chamber containing pistons therein connected with said shaft, a set of forward valve means and a similar set of reverse valve means for the primary chamber, a control valve means for admitting air under relatively high pressure to either set of said valve means to drive the motor respectively in either a forward or a reverse direction, a set of forward valve means and a similar set of reverse valve means for the secondary chamber, and means for transferring the used air from the primary chamber through the primary valve means to the secondary valve means and associated pistons, there to further utilize said used air in driving the motor in either a forward or a reverse direction.

6. The subject matter set forth in claim 5, wherein the primary valve means and the secondary valve means each include intake valve means and valve means for admitting air respectively to the inner sides and also to the outer sides of the respective pistons.

7. A compressed air motor comprising a crank case containing a primary air chamber and a secondary air chamber with a crank shaft therein, a pair of oppositely directed cylinders on each of said chambers, a pair of pistons mounted in balanced relation in each pair of cylinders and connected with the crank shaft, the pairs being staggered so that one pair is in advance of the other to produce a lead-off and follower effect, two similar sets of valve means on the primary chamber and likewise two similar sets on the secondary chamber, one set being adapted for effecting a forward rotation and the other set for effecting a reverse rotation of the motor, each set including means for admitting the air to the chamber against the inner faces of its pistons and produce a balanced impulse to the crank shaft, also means for admitting air to the outer faces of the pistons, control means for selectively admitting the air to either the forward or the reverse set of valve means, and means for transferring the air from the primary chamber and valve means to the secondary valve means and associated pistons for additionally utilizing the used air in driving the motor.

8. A compressed air motor comprising a crank case containing a primary air chamber and a secondary air chamber and a crank shaft therein, a pair of oppositely directed cylinders on each of said chambers, a pair of pistons mounted in balanced relation in each pair of cylinders and connected with the crank shaft, the pairs being staggered so that one pair is in advance of the other to produce a lead-off and a follower effect, a forward set and a reverse set of valve means on the primary chamber, control valve means for selectively admitting the air through either the forward or the reverse valve means into the primary chamber and to the inner faces of its pistons, whereby to drive the crank shaft in either the forward or the reverse direction, a pair of valves and channels leading therefrom to the heads of said cylinders for admitting the air to the outer faces of the primary pistons, one being active for the forward and the other for the reverse rotation of the motor, means for transferring the air from the primary chamber and its valve means towards the secondary chamber, and a forward set and a reverse set of valve means on the secondary chamber to admit the transferred air thereto from the corresponding set of primary valves, to act either against the inner faces of its pistons or against the outer faces thereof, whereby to drive the crank shaft selectively in the forward and likewise in the reverse direction.

9. A compressed air motor comprising a primary air chamber for first utilizing highly compressed air and a secondary air chamber for thereafter further utilizing said air to drive the motor, a pair of oppositely directed cylinders on each chamber and having a pair of pistons movable in counter-balanced relation therein, a crank shaft for driving said pistons, the pairs of pistons in the two chambers being staggered so that one pair is in advance of the other to produce a lead-off and follower effect, two similar sets of valve chambers and valve means provided on said primary chamber and likewise on said secondary chamber, one set for effecting a forward rotation and the other set for effecting a reverse rotation of the crank shaft, cam members on said shaft for actuating said sets of valve means, each set of valve means including an intake chamber and intake valve for admitting air into the casing chamber to drive its pistons outwardly with equal force, also means to admit air to the outside of one of the associated pistons to drive it inwardly, each valve set on the primary chamber including transfer means to conduct the used air from the primary chamber to the intake valve on the secondary chamber to be admitted for driving the secondary pistons outwardly with equal force, means for exhausting the air from the outside of the outwardly moving primary pistons, each valve set on the secondary chamber including a valve and outlet means adapted to exhaust the used air ahead of the secondary pistons to the atmosphere, and control valve means for admitting the air selectively to the intake chamber of either the forward or the reverse valve set on the primary chamber.

PIETRO MANISCALCO.